(12) United States Patent
Pliml

(10) Patent No.: US 8,176,843 B2
(45) Date of Patent: May 15, 2012

(54) MULTI-COMPARTMENT GREASE TRAY

(75) Inventor: David Adam Pliml, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 704 days.

(21) Appl. No.: 12/330,744

(22) Filed: Dec. 9, 2008

(65) Prior Publication Data

US 2010/0139642 A1 Jun. 10, 2010

(51) Int. Cl.
*A47J 27/00* (2006.01)

(52) U.S. Cl. ........................................................ 99/446

(58) Field of Classification Search ............... 99/426, 99/446, 400, 422, 444, 445; 220/23.6; D7/402; 206/505; 165/64
See application file for complete search history.

(56) References Cited

U.S. PATENT DOCUMENTS

| | | | | |
|---|---|---|---|---|
| 1,745,340 A | * | 1/1930 | Parker | 99/446 |
| 3,256,806 A | * | 6/1966 | Jordan | 99/444 |
| 3,683,791 A | * | 8/1972 | Rast, Jr. | 99/340 |
| 4,307,659 A | | 12/1981 | Martin et al. | |
| 4,355,570 A | | 10/1982 | Martin et al. | |
| 4,418,615 A | | 12/1983 | Higgins | |
| 4,677,964 A | * | 7/1987 | Lohmeyer et al. | 126/41 R |
| 4,773,319 A | | 9/1988 | Holland | |
| 4,850,333 A | * | 7/1989 | Dellrud et al. | 126/25 A |
| 5,163,358 A | * | 11/1992 | Hanagan et al. | 99/339 |
| 5,261,388 A | * | 11/1993 | Wright et al. | 126/41 R |
| 5,713,265 A | | 2/1998 | Strader et al. | |
| 6,024,014 A | | 2/2000 | Kasai | |
| 6,257,130 B1 | * | 7/2001 | Schlosser | 99/482 |
| 6,289,793 B1 | | 9/2001 | Hu et al. | |
| 6,314,871 B1 | * | 11/2001 | Holbrook et al. | 99/401 |
| 6,362,458 B1 | | 3/2002 | Sargunam et al. | |
| 6,435,078 B1 | | 8/2002 | Batten et al. | |
| 6,854,380 B2 | * | 2/2005 | Wanat | 99/400 |
| 6,962,106 B2 | | 11/2005 | Viraldo | |
| 2005/0121020 A1 | | 6/2005 | McLemore et al. | |
| 2005/0229917 A1 | | 10/2005 | Profitt et al. | |
| 2005/0235980 A1 | | 10/2005 | Hansen et al. | |
| 2007/0006867 A1 | | 1/2007 | Karney et al. | |
| 2007/0221202 A1 | * | 9/2007 | Bruno et al. | 126/41 R |
| 2007/0256683 A1 | | 11/2007 | Zimmerman | |
| 2007/0277678 A1 | | 12/2007 | Mangano | |
| 2007/0295223 A1 | | 12/2007 | Reischmann et al. | |
| 2008/0121221 A1 | | 5/2008 | Wang et al. | |

\* cited by examiner

*Primary Examiner* — Alvin Hunter
*Assistant Examiner* — M Chambers
(74) *Attorney, Agent, or Firm* — Kirk W. Goodwin; Barnes & Thornburg, LLP

(57) ABSTRACT

An outdoor cooking grill includes a removeable grease drip pan. The grease drip pan has a number of removable fluid pans designed to collect grease and/or other fluid.

17 Claims, 11 Drawing Sheets

US 8,176,843 B2

MULTI-COMPARTMENT GREASE TRAY

TECHNICAL FIELD

The present disclosure relates generally to outdoor cooking grills and more particularly to outdoor cooking grills with grease drip pans.

BACKGROUND

Preparing meats and other foods on an outdoor cooking grill is a well-known activity. The user places uncooked food on a grill surface and exposes it to heat to prepare the food as desired. During cooking, grease may drip from the food, and the outdoor cooking grill may collect the grease in a grease drip pan. When the grease fills the pan, the user must empty and clean the pan.

SUMMARY

According to one aspect, an outdoor cooking grill is disclosed. The outdoor cooking grill has a grilling surface and a first heating element positioned below the grilling surface. The outdoor cooking grill also has a drip pan positioned below the first heating element. The drip pan includes a bottom wall and a first pair of rails extending upwardly from the bottom wall. The first pair of rails is positioned below the first heating element. A first fluid pan is supported on the first pair of rails of the drip pan. The first fluid pan is removeable from the drip pan.

In some embodiments, the outdoor cooking grill further includes a grill housing having a lower wall with a first number of holes defined therein. The lower wall is positioned between the first heating element and the first fluid pan such that fluid passes through the first number of holes and into the first fluid pan. Additionally, in some embodiments, the outdoor cooking grill includes a frame. The grill housing is secured to the frame, and the drip pan is moveable relative to the grill housing. In some embodiments, the drip pan is removable from the frame.

In some embodiments the outdoor cooking grill includes a second heating element positioned below the grilling surface. The drip pan further includes a second pair of rails extending upwardly from the bottom wall. The second pair of rails is positioned below the second heating element. The outdoor cooking grill also includes a second fluid pan supported by the second pair of rails of the drip pan. The second fluid pan is removable from the drip pan.

In some embodiments, the lower wall of the grill housing has a second number of holes defined therein. The lower wall is positioned between the second heating element and the second fluid pan such that fluid passes through the second number of holes and into the second fluid pan.

In some embodiments, the outdoor cooking grill includes a third fluid pan. The third fluid pan contacts the bottom wall of the drip pan. The third fluid pan is removable from the drip pan. In some embodiments, the second fluid pan is positioned parallel to the first fluid pan in the drip pan. Additionally, in some embodiments, the third fluid pan is positioned perpendicular to the first fluid pan and the second fluid pan in the drip pan.

The outdoor cooking grill further includes a grill housing. The grill housing has a front panel with control knobs mounted thereto. The drip pan is positioned below the first panel of the grill housing. Additionally, the outdoor cooking grill further includes a lid secured to the grill housing. The lid rotates relative to the grill housing between an open position in which the grilling surface is uncovered, and a closed position in which the lid encloses the grilling surface.

In some embodiments, the first fluid pan has a pair of grooves that receive the first pair of rails, and the second fluid pan has a pair of grooves that receive the second pair of rails According to another aspect, an outdoor cooking grill includes a grill housing having a lower wall, a grilling surface secured to the grill housing, a first heating element positioned below the grilling surface, and a second heating element positioned below the grilling surface. The outdoor cooking grill also includes a drip pan positioned below the first and second heating elements. The drip pan includes a bottom wall and a first pair of rails extending upwardly from the bottom wall, which are positioned below the first heating element. The drip pan also includes a second pair of rails extending upwardly from the bottom wall, which are positioned below the second heating element. The outdoor cooking grill also includes a first removeable fluid pan supported by the first pair of rails of the drip pan, and a second removeable fluid pan supported by the first pair of rails of the drip pan.

According to another aspect, an outdoor cooking grill includes a grilling surface and a pair of heating elements positioned below the grilling surface. A drip pan is positioned below the heating elements. The drip pan includes a pair of removable fluid pans respectively positioned below the heating elements. The removable fluid pans are positioned parallel to one another. A third removable fluid pan is positioned perpendicular to the other fluid pans.

BRIEF DESCRIPTION OF THE DRAWINGS

The detailed description particularly refers to the following figures, in which.

DETAILED DESCRIPTION OF THE DRAWINGS

Figure 1:
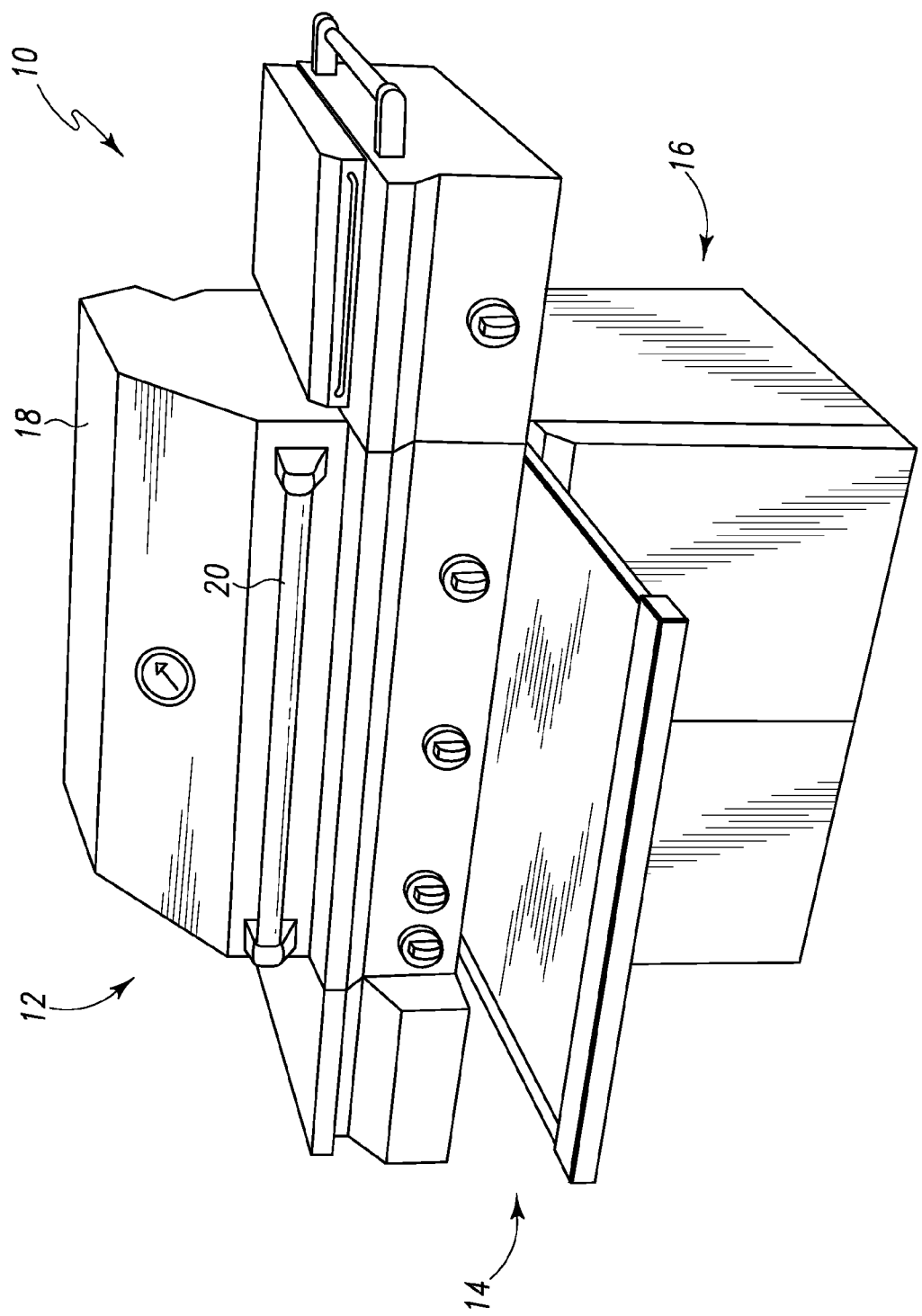
FIG. 1 is a perspective view of an outdoor cooking grill.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, an outdoor cooking grill 10 includes a grill housing 12, a grease drip pan 14, and a frame 16. The grill housing 12 is secured to the frame 16. For example, the grill housing 12 may be secured to the frame 16 via suitable fasteners such as screws, bolts, or the like. It should be appreciated that in other embodiments the grill housing 12 and the frame 16 could be formed as a monolithic component.

A lid 18 including a handle 20 is secured to the grill housing 12. The lid 18 is hinged to the back edge of the grill housing 12. The handle 20 is operable by the user to rotate the lid 18 relative to the grill housing 12.

Figure 2:
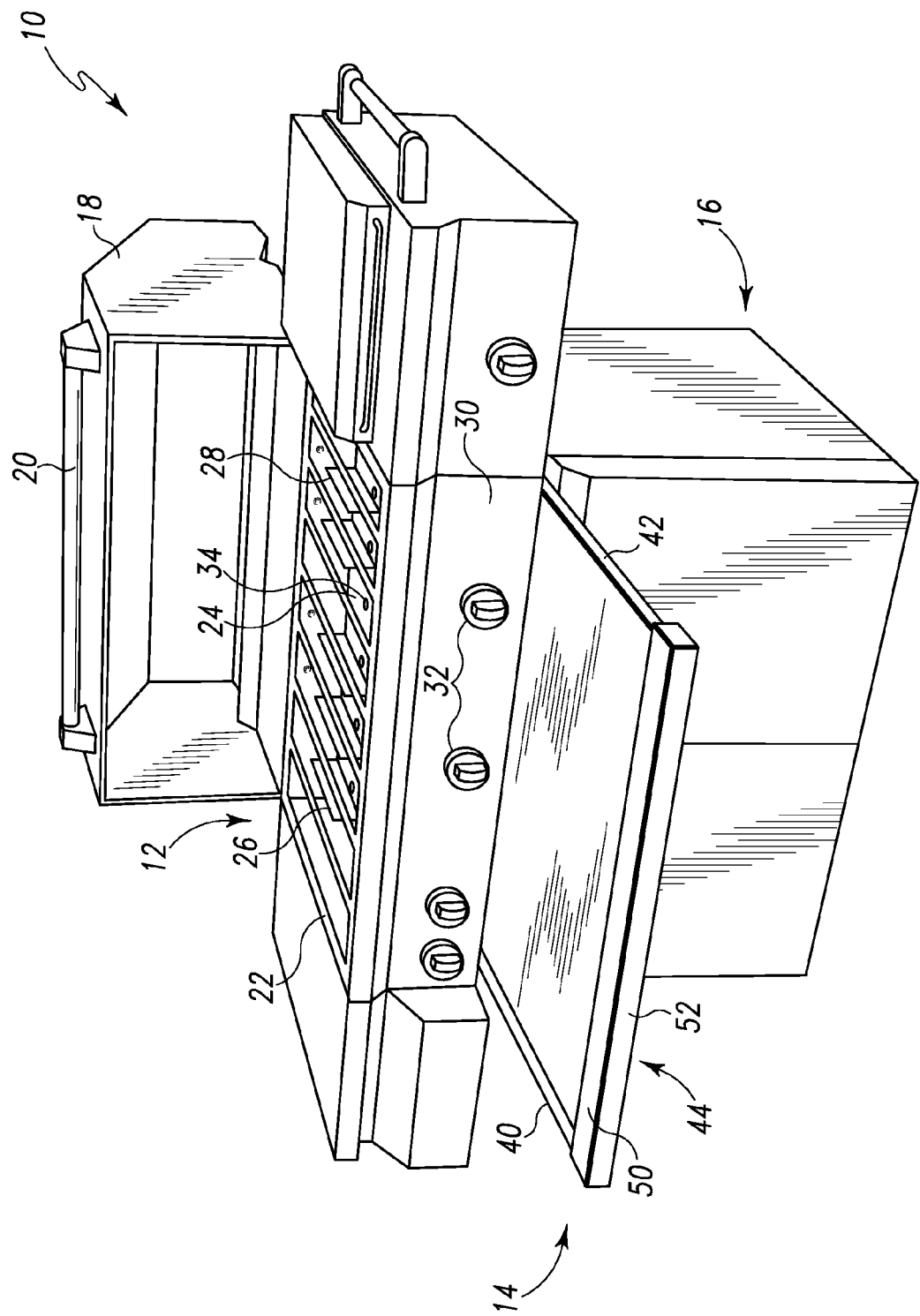
FIG. 2 is a view similar to FIG. 1, but showing the outdoor cooking grill lid opened.

Referring to FIG. 2, the grill housing 12 includes a grilling surface 22, a lower wall 24, a number of heating elements such as burners 26, 28, and a front panel 30. User access to the grilling surface 22 is permitted when the lid 18 is in an opened position. When the lid 18 is in a closed position, the lid 18 encloses the grilling surface 22 and prevents user access to the grilling surface 22 (see FIG. 1). The burners 26, 28 are secured to the grill housing 12 at a position between the grilling surface 22 and the lower wall 24. A number of control knobs 32 are mounted on the front panel 30. The control knobs 32 are operable to control the burners 26, 28.

The grilling surface 22 is configured to receive foodstuffs (not shown) for cooking. A number of holes 34 extend through the lower wall 24 of the grill housing 12. Grease or fluid draining from the foodstuffs positioned on the grilling surface 22 passes through the number of holes 34 out of the grill housing 12 and into the drip pan 14.

The drip pan 14 is positioned below the grill housing 12. The drip pan 14 includes a pair of rails 40, 42 that are received in a pair of corresponding slots (not shown) in the frame 16. The drip pan 14 also includes a handle 44 that is operable by the user to slide the drip pan 14 between a cooking position (not shown) in which the drip pan 14 is retracted into the frame 16 and a cleaning position (see FIG. 2) in which the drip pan 14 is extended out of the frame 16. The drip pan 14 is positioned below the burners 26, 28 and the lower wall 24 when the drip pan 14 is in the cooking position. In some embodiments, the drip pan 14 is also removable from the frame 16. Additionally, in some embodiments, the drip pan 14 may be fixed relative to the grill housing 12 in the cooking position.

The handle 44 has an upper surface 50 and an outer wall 52. The outer wall 52 extends downwardly from the upper surface 50. The handle 44 of the drip pan 14 is positioned below the front panel 30 of the grill housing 12 when the drip pan 14 is in the cooking position. The outer wall 52 of the handle 44 is configured to be flush with the front panel 30 of the grill housing 12 when the drip pan 14 is in the cooking position.

Figure 3:
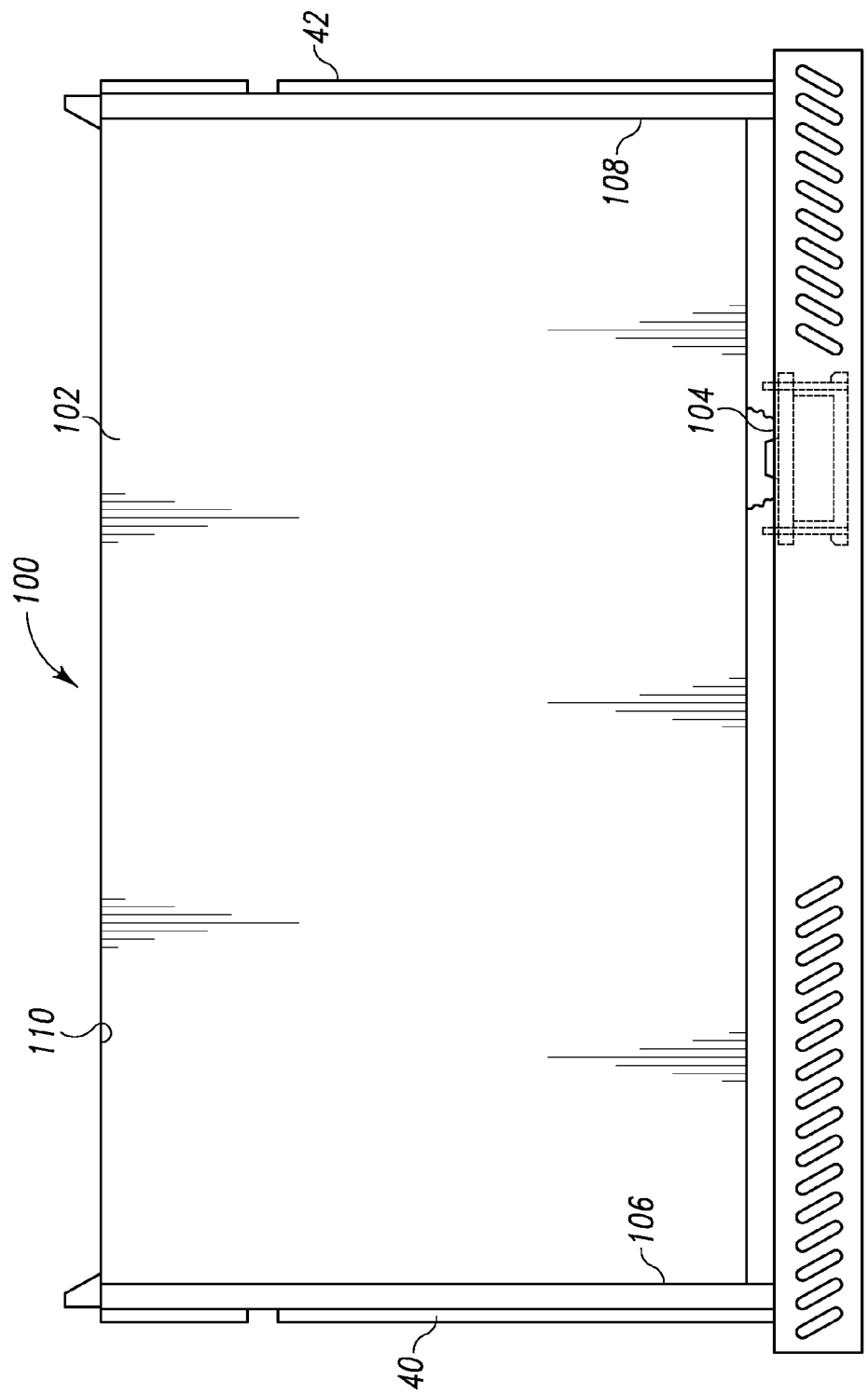
FIG. 3 is a top plan view of the grease drip pan of the outdoor cooking grill of FIG. 1.

Referring now to FIG. 3, the drip pan 14 includes a tray 100 having a bottom surface 102. The tray 100 is configured to contain fluid draining from the grill housing 12. A set of side walls 104, 106, 108, and 110 extend upwardly from the bottom surface 102 to form a volume to contain fluid within the tray 100. The handle 44 is secured to the side wall 104, and the rails 40, 42 are secured to the side walls 106, 108, respectively.

Figure 4:
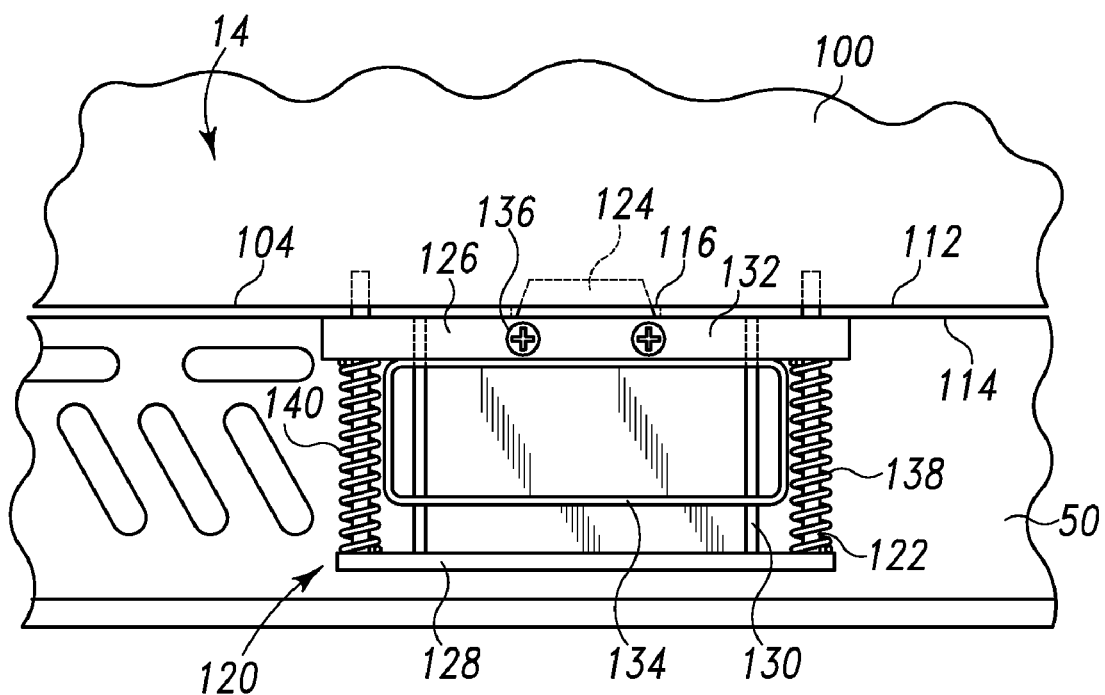
FIG. 4 is a fragmentary bottom plan view of the grease drip pan of FIG. 3 with the plug positioned in the drain hole of the grease drip pan.
Figure 5:
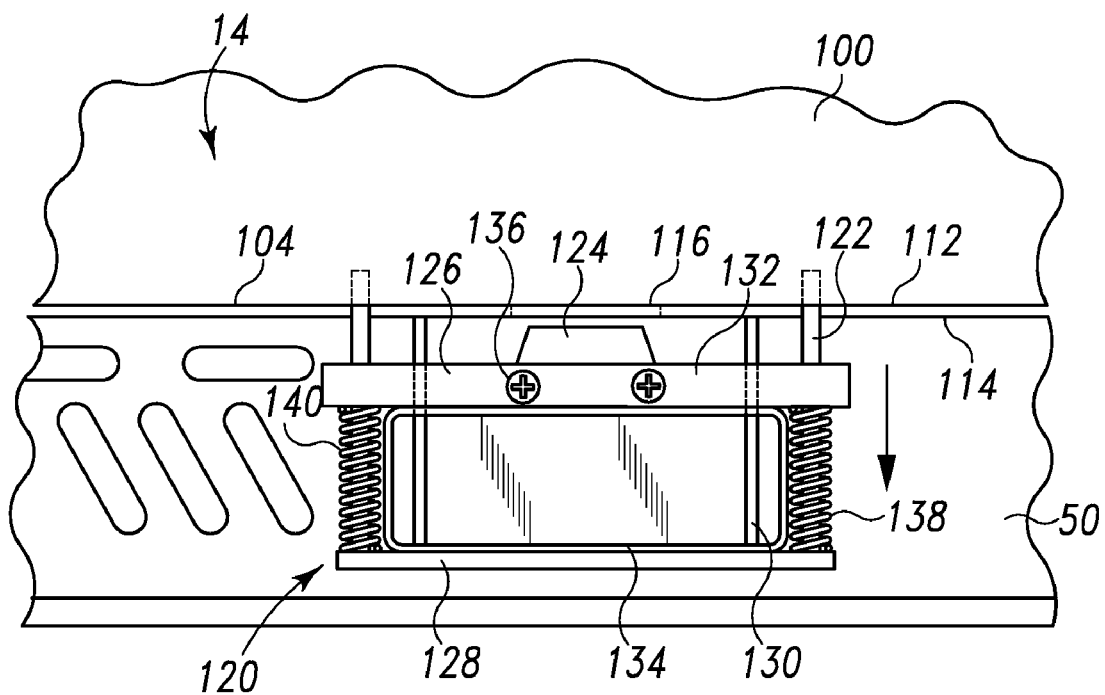
FIG. 5 is a view similar to that of FIG. 6, but showing the plug removed from the drain hole of the grease drip pan.

Referring now to FIGS. 4 and 5, the side wall 104 has an inner surface 112, an outer surface 114, and a drain hole 116. The drain hole 116 extends from the inner surface 112 to the outer surface 114 of the side wall 102. As discussed in more detail below, the hole 116 is configured such that fluid may pass from the tray 100 through the hole 116 to the exterior of the drip pan 14.

A drain assembly 120 is positioned below the upper surface 50 of the handle 44. The drain assembly 120 includes a plug 124, a grip 126, and a brace 128. The brace 128 is secured to the side wall 104 of the drip pan 14 via a pair of rods 122 and a pair of guides 130 such that the brace 128 is maintained in a fixed position relative to the side wall 104.

The grip 126 includes a mounting block 132 having a hand loop 134 secured to one side thereof. The plug 124 is secured to the other side of the mounting block 132 via a pair of screws 136. The rods 122 and guides 130 extend through the mounting block 132. As such, the mounting block 132 slides back and forth along the rods 122 and the guides 130. A pair of springs 138, 140 extend over the pair of rods 122. The springs 138, 140 urge the mounting block 132 toward the side wall 104 thereby placing the plug 124 into the drain hole 116.

Figure 6:
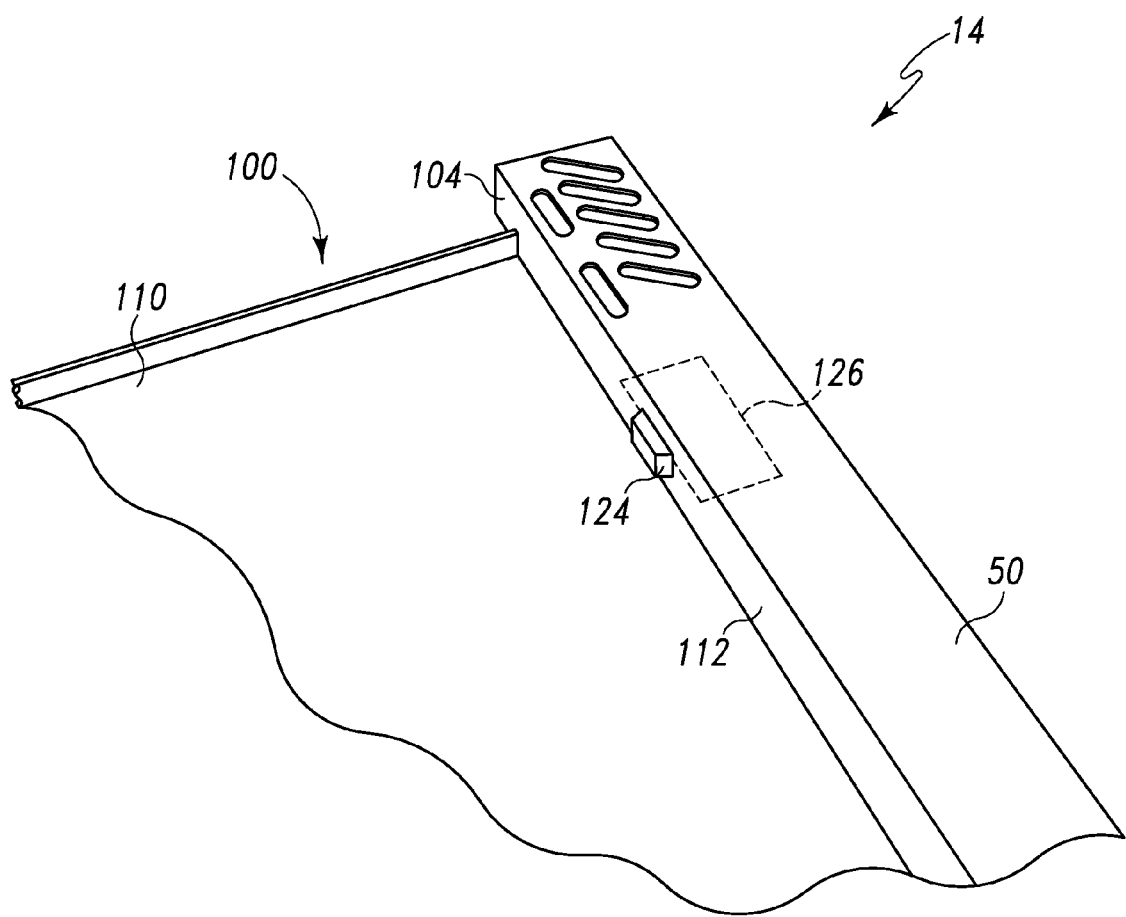
FIG. 6 is a fragmentary perspective view of the grease drip pan of FIG. 3 showing the plug positioned in the drain hole of the grease drip pan.

Referring to FIGS. 4-7, the grip 126 (and hence the plug 124) is movable relative to the side wall 104. The grip 126 slides back and forth over the rods 122 and the guides 130 to selectively drain or seal the drip pan 14. In particular, as shown in FIGS. 4 and 6, the springs 138, 140 exert a spring bias on the grip 126 that positions the plug 124 in the drain hole 116. The plug 124 is sized such that fluid is prevented from passing through the drain hole 116 when the plug 124 is positioned in the drain hole 116.

Figure 7:
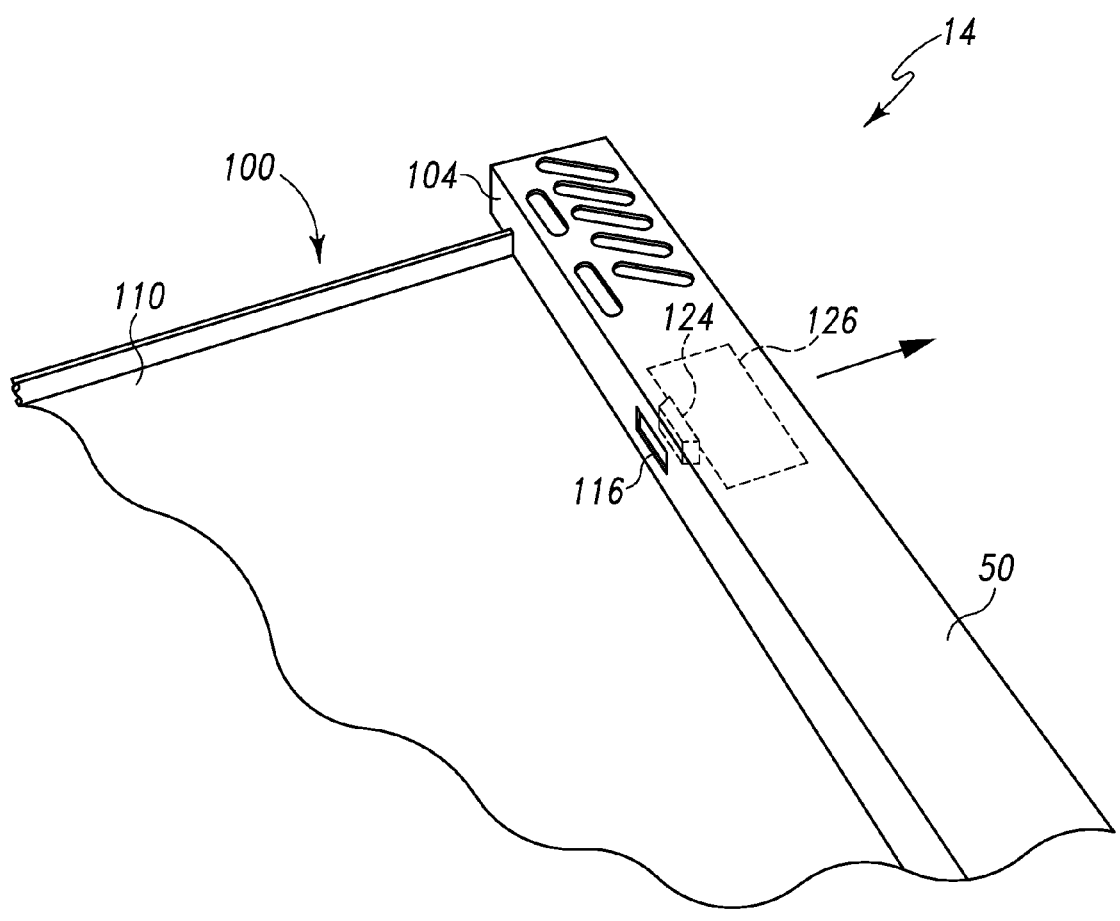
FIG. 7 is a view similar to FIG. 6, but showing the plug removed from the drain hole of the grease drip pan.
Figure 8:
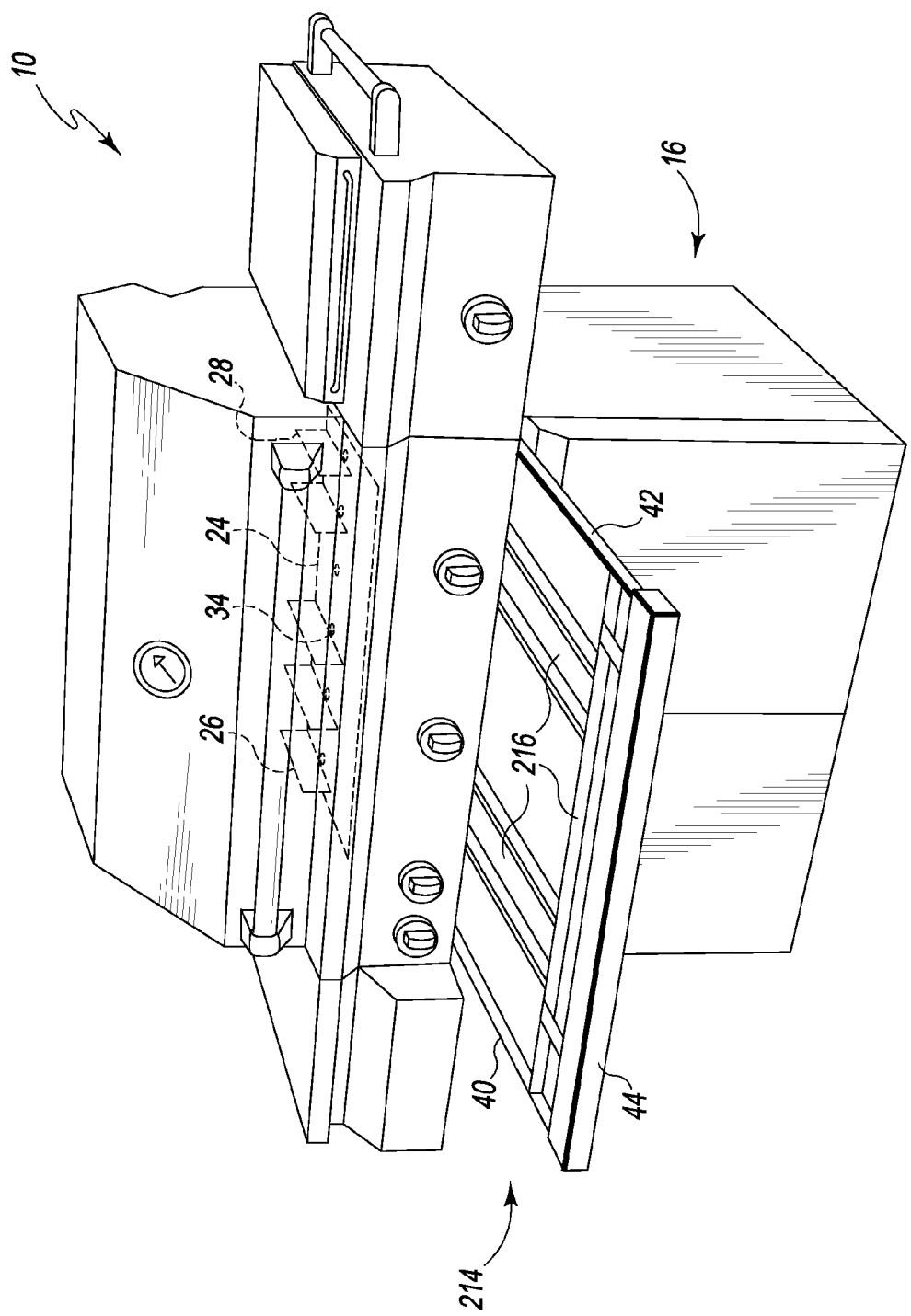
FIG. 8 is a perspective view of an outdoor cooking grill with another embodiment of the grease drip pan.

The grip 126 is operable by the user to remove the plug 124 from the drain hole 116. In particular, as shown in FIGS. 5 and 7, when the user grabs the grip 126 and pulls it in the direction away from the side wall 104, the springs 138, 140 are compressed and the plug 124 is moved out of the drain hole 116. When the plug 124 is removed from the drain hole 116 in such a manner, fluid (e.g., grease) may pass from the tray 100 through the drain hole 116 to the exterior of the drip pan 14. The grease may be collected in a receptacle such as a bucket. When the user releases the grip 126, the springs 132, 134 urge the plug 124 back into position in the drain hole 116 thereby sealing again the drip pan 14.

In some embodiments, the drain hole 116 may be defined in the bottom surface 102 of the tray 102. In such cases, the plug 124 is also positioned in the drain hole 116 of the bottom surface 102 to prevent fluid from passing through it. An elongated rod or other linkage (not shown) may be used to couple the grip 126 located on the front of the drip pan 14 to such a remotely located plug 124.

Referring now to FIGS. 8-13, the outdoor cooking grill 10 is shown with a different embodiment of a drip pan (hereinafter referenced as a drip pan 214). Some features of the embodiment illustrated in FIGS. 8-13 are substantially similar to those discussed above in reference to the embodiment of FIGS. 1-7. Such features are designated in FIGS. 8-13 with the same reference numbers as those used in FIGS. 1-7.

The drip pan 214 includes a number of fluid pans 216 housed in a tray 220. Similar to the embodiment of FIGS. 1-7, the drip pan 214 includes a pair of rails 40, 42 that are received in a pair of corresponding slots (not shown) in the frame 16. In a similar manner to the drip pan 14 of FIGS. 1-7, a handle 44 of the drip pan 214 is operable by the user to slide the drip pan 14 between a cooking position (not shown) and a cleaning position (see FIG. 8) relative to the grill housing 12. The drip pan 214 is positioned below the burners 26, 28 and the lower wall 24 of the grill housing 12 when the drip pan 214 is positioned in the cooking position. The fluid pans 216 are configured to be removed from the drip pan 214 when the drip pan 214 is in the cleaning position. Additionally, the drip pan is removable from the frame 16.

Figure 9:
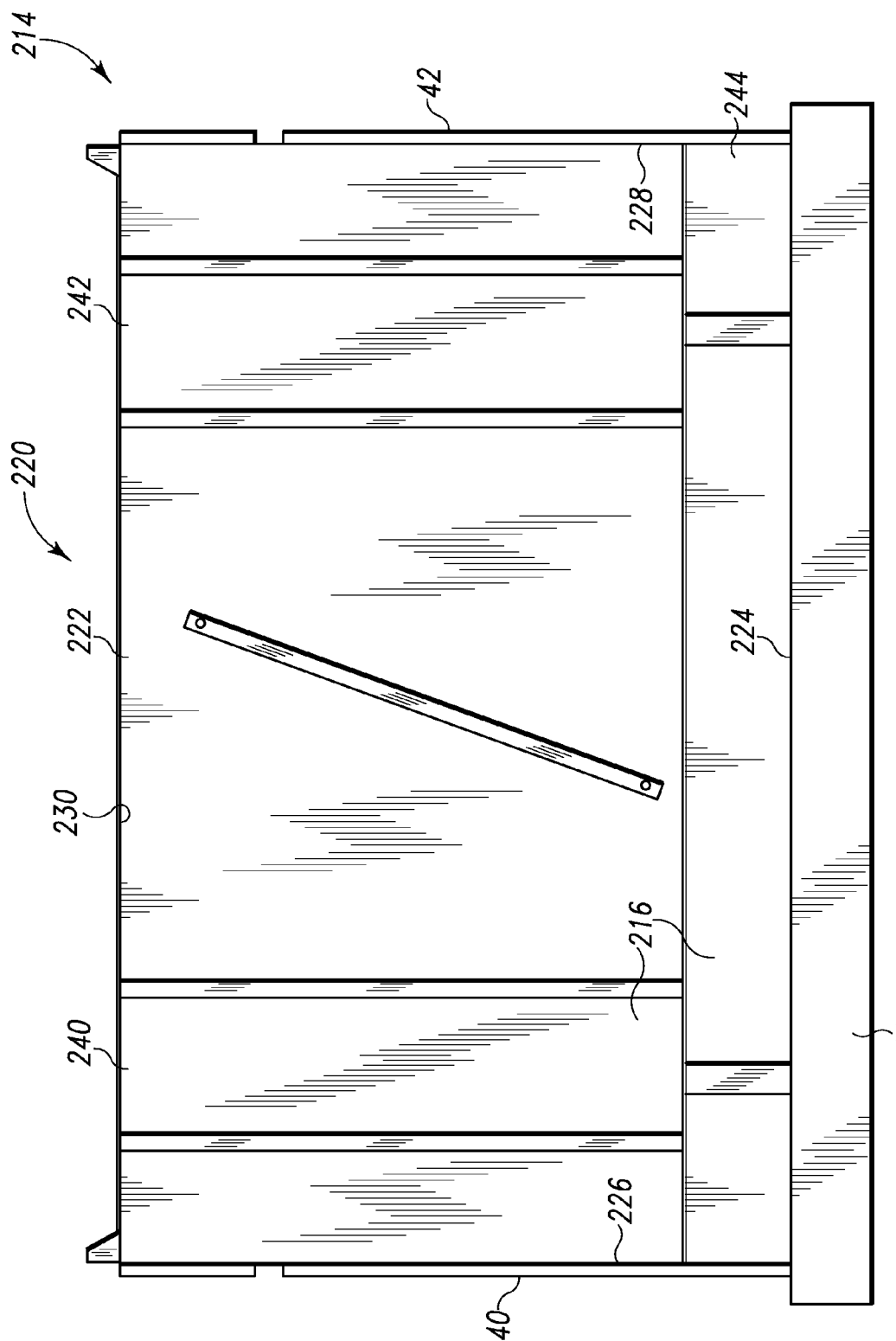
FIG. 9 is a top plan view of the grease drip pan the outdoor cooking grill of FIG. 8 showing a number of fluid pans housed in the grease drip pan.

As shown in FIG. 9, the tray 220 includes a bottom surface 222. A set of side walls 224, 226, 228, and 230 extend upwardly from the bottom surface 222. The handle 44 is secured to the side wall 222 while the rails 40, 42 are secured to the side walls 226, 228, respectively.

The fluid pans 216 include a left burner pan 240, a right burner pan 242, and a drain pan 244. When the drip pan 214 is retracted into the frame 16, the burner pans 240, 242 are positioned such that fluid draining from the foodstuffs positioned on the grilling surface 22 advances out of the grill housing 12 through the number of holes 34 and into the burner pans 240, 242. In other embodiments, the fluid pans 216 may include additional burner pans.

Figure 10:
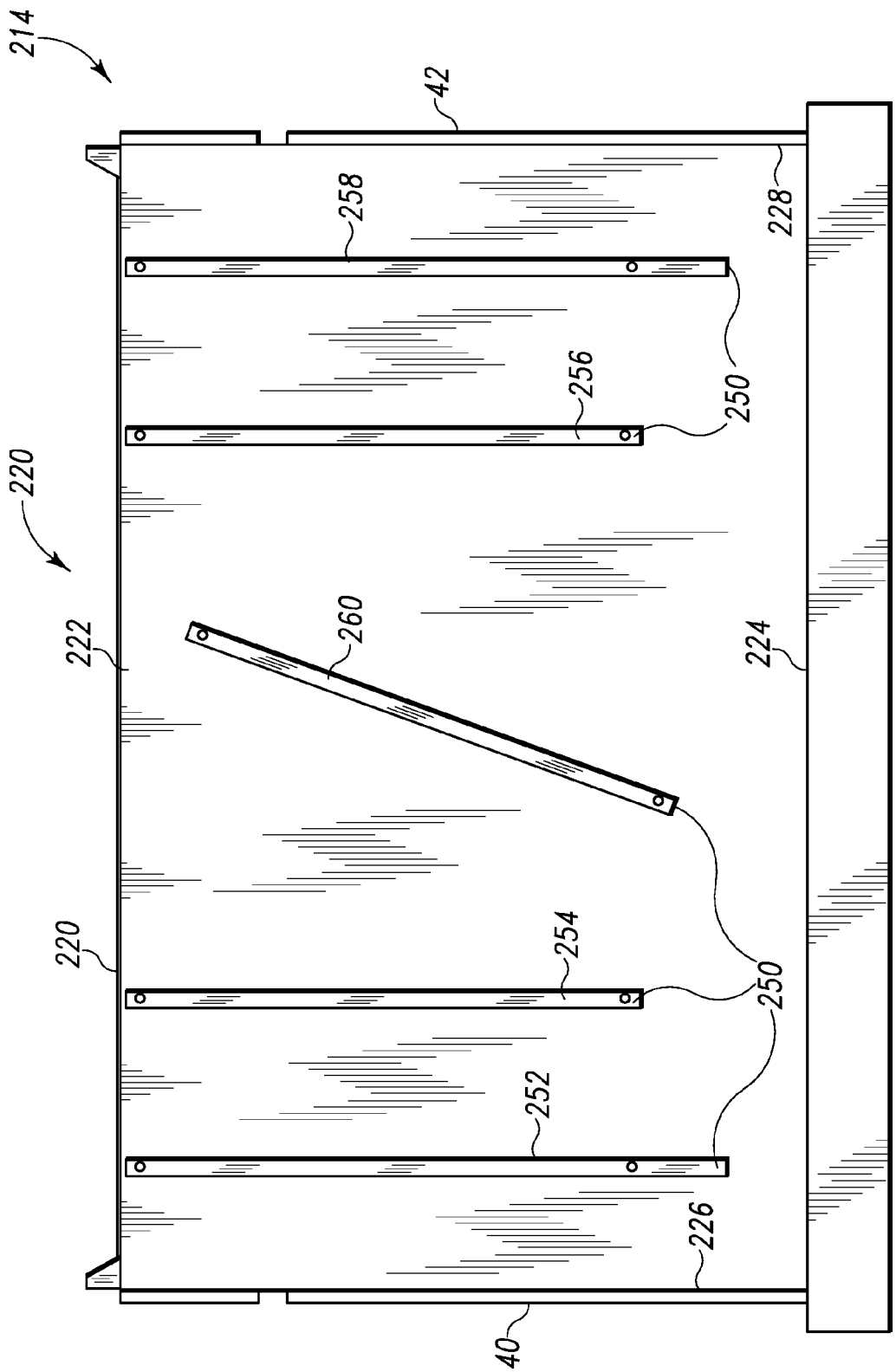
FIG. 10 is a view similar to FIG. 9, but showing the fluid pans removed from the grease drip pan.

Referring now to FIG. 10, the burner pans 240, 242 and the drain pan 244 have been removed from the drip pan 14. A plurality of rails 250 extend upwardly from the bottom surface 222 to support the burner pans 240, 242 on the tray 220. For example, a pair of rails 252, 254 support the left burner pan 240. When the left burner pan 240 is placed on the rails 252, 254 and the drip pan 214 is positioned in its cooking position, the left burner pan 240 is located below the burner 26. The rail 252 may be configured with a tab or other such structure to prevent the left burner pan 240 from sliding in the tray 220.

Similarly, a pair of rails 256, 258 support the right burner pan 242. When the right burner pan 242 is placed on the rails 256, 258 and the drip pan 214 is positioned in its cooking position, the right burner pan 242 is located below the burner 26. Like the rail 252, the rail 256 may be configured with a tab or other such structure to prevent the right burner pan 242 from sliding in the tray 220.

As shown in FIG. 9, the right burner pan 242 is parallel to the left burner pan 240 when the burner pans 240, 242 are positioned on the rails 250.

In the illustrative embodiment described herein, one of the rails 250 is used to prevent improper placement of the fluid pans 216. For example, the rail 260 may be used to prevent a user from placing one of the fluid pans 216 in a position where the user cannot retract or extend the drip pan 14. The rail 260 may also prevent the user from placing a burner pan in a position that is not located below one of the burners. For example, in the illustrative embodiment of FIG. 10, the rail 260 is arranged diagonally on the bottom surface 222 of the tray 220. Among other things, such an arrangement prevents the user from improperly placing one of the fluid pans 216 in the center of the tray 220 at a location where it would not be located below one of the holes 34 in the lower wall 24 of the grill housing 12 through which grease flows. It should be appreciated that in other embodiments any number of rails, guides, tabs, or the like may be used to prevent improper placement of the fluid pans 216 in the tray 220.

Figure 11:
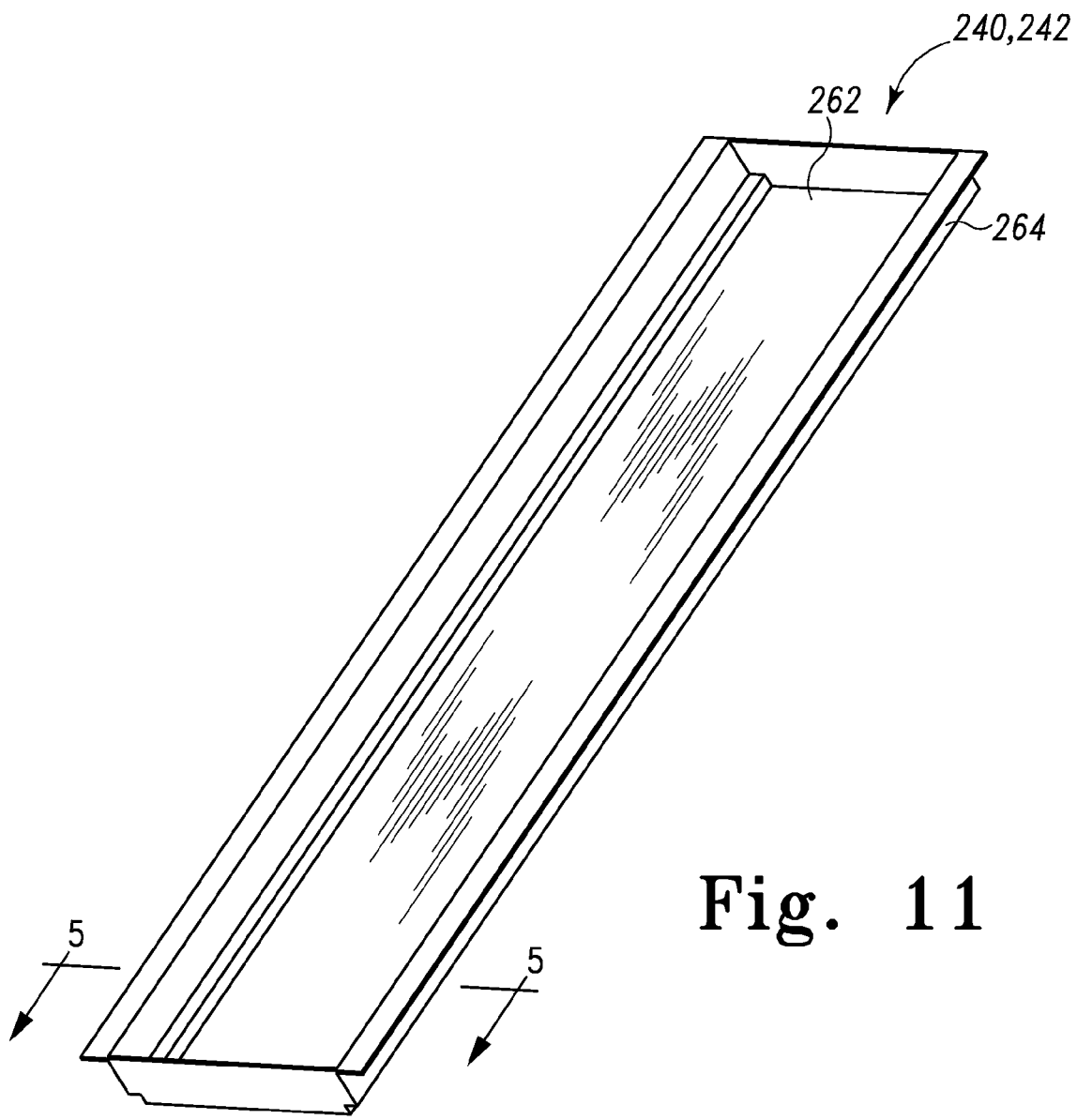
FIG. 11 is a perspective view of one of the fluid pans of FIG. 9.
Figure 12:
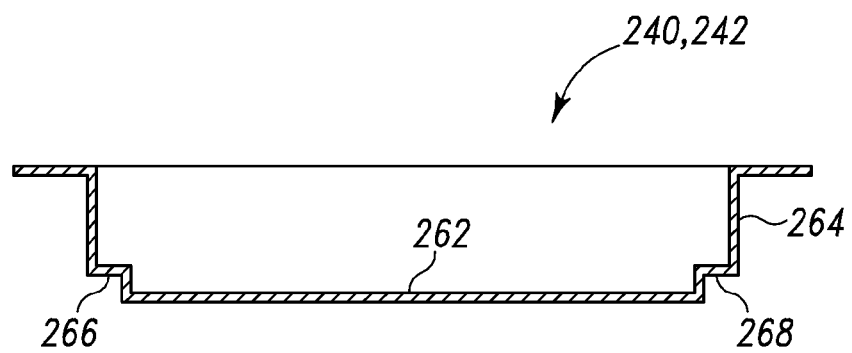
FIG. 12 is a cross-sectional view of the fluid pan of FIG. 11.

Referring to FIG. 11, each of the burner pans 240, 242 has a bottom wall 262 with a number of side walls 264 extending upwardly therefrom. The burner pans 240, 242 are contoured to engage the rails 250. For example, as illustrated in FIG. 12, the side walls 264 have elongated grooves 266, 268 formed therein to receive the top surface of the rails 250.

In other embodiments, the tray 220 may be configured without rails (i.e., without the rails 250). In such embodiments, the bottom wall 262 of the burner pans 240, 242 may contact the bottom surface 222 of the tray 220. Additionally, in such embodiments, the burner pans 240, 242 may be sized to be in contact with each other and with the side walls 226, 228 when the burner pans are positioned in tray 220. That is, one side of the burner pan 240 may contact the side wall 226 and the other side may contact the burner pan 242 when the burner pans are positioned in tray 220. Similarly, one side of burner pan 242 may contact the side wall 228 and the other side may contact the burner pan 240 when the burner pans are positioned in tray 220. In such an embodiment, a spacer block may also be used to separate the burner pans 240, 242.

Figure 13:
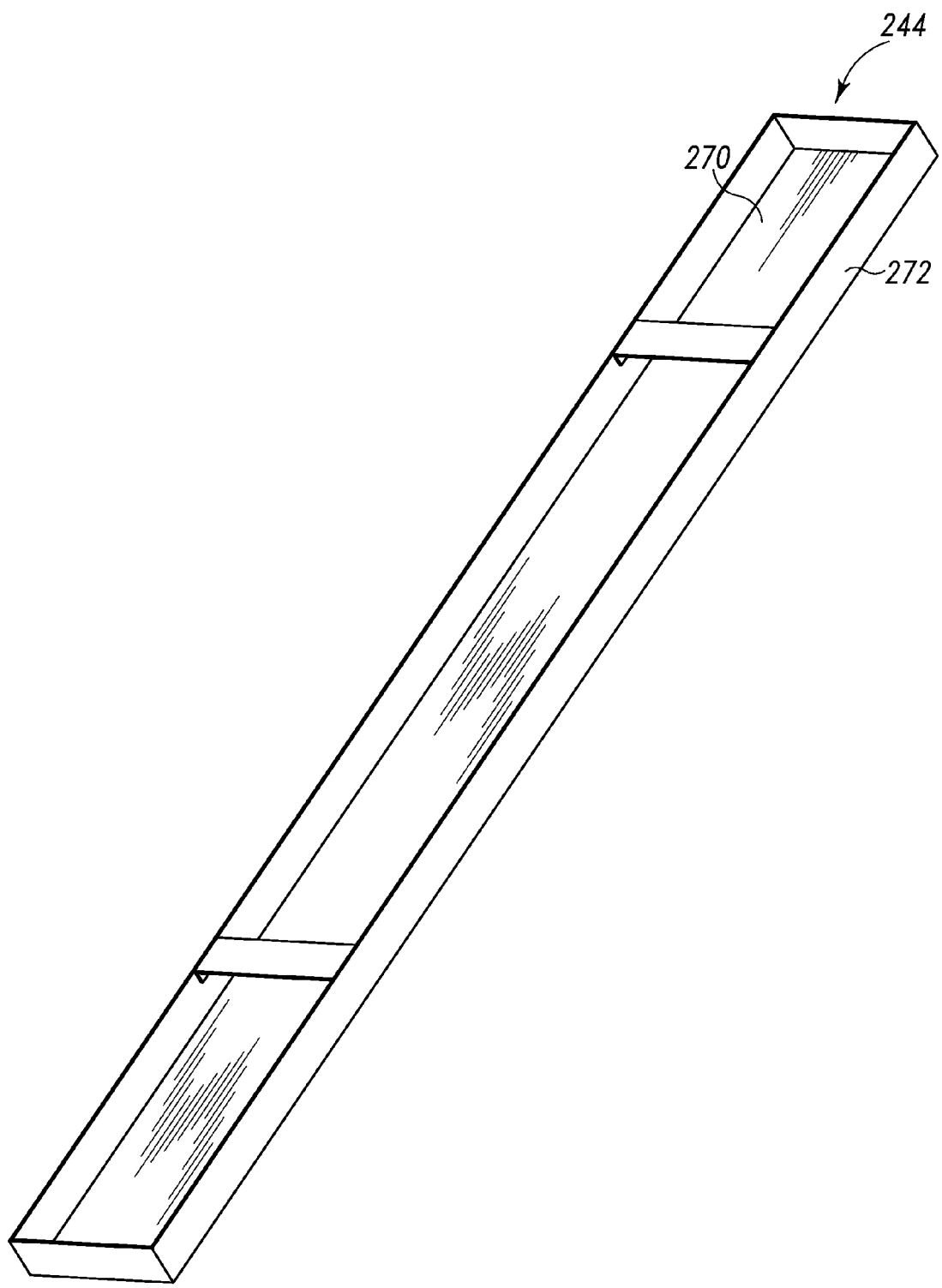
FIG. 13 is a perspective view of another embodiment of one of the fluid pans of FIG. 9.

The burner pans 240, 242 are located below the burners 26, 28, respectively, when the drip pan 214 is positioned in its cooking position Referring to FIG. 13, the drain pan 244 has a bottom wall 270 with a number of side walls 272 extending upwardly therefrom. As shown in FIG. 9, the drain pan 244 is positioned in the front of the tray 220 (i.e., along the front side wall 224). In such a way, the drain pan 244 is arranged in a perpendicular relationship to the burner pans 240, 242. The bottom wall 270 of the drain pan 244 contacts the bottom surface 222 of the tray 220. In other embodiments, the drain pan 244 may be supported by the use of additional rails 250.

In operation, the fluid pans 216 are positioned in the drip pan 214 to collect fluid draining from the grill housing 12. In particular, the burner pans 240, 242 are positioned to collect fluid (i.e., grease) draining from foodstuffs being cooked on the grilling surface 22. The grease advances out of the grill housing 12 through the holes 34 and into the burner pans 240, 242. The drain pan 244 is positioned to collect rainwater or other moisture draining from the grill housing 12. In this way, grease and water are collected in separate fluid pans 216.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An outdoor cooking grill, comprising:
   a grilling surface,
   a first heating element positioned below the grilling surface,
   a drip pan positioned below the first heating element, the drip pan comprising (i) a bottom wall, (ii) a first pair of rails extending upwardly from the bottom wall, the first pair of rails being positioned below the first heating element, (iii) a second pair of rails extending upwardly from the bottom wall, the second pair of rails being positioned below the grilling surface parallel to the first pair of rails, and (iv) a central rail extending upwardly from a central section of the bottom wall, the central rail extending diagonally between the first pair of rails and the second pair of rails,
   a first fluid pan supported on the first pair of rails of the drip pan, and
   a second fluid pan supported on the second pair of rails of the drip pan and positioned parallel to the first fluid pan,
   wherein (i) the first fluid pan is removeable from the drip pan, (ii) the second fluid pan is removable from the drip pan, and (iii) the central rail is spaced apart from the first fluid pan and the second fluid pan and is configured to prevent the first fluid pan and the second fluid pan from being positioned on the central section of the bottom wall.

2. The outdoor cooking grill of claim 1, further comprising a grill housing having a lower wall with a first number of holes defined therein, wherein the lower wall is positioned between the first heating element and the first fluid pan such that fluid passes through the first number of holes and into the first fluid pan.

3. The outdoor cooking grill of claim 2, further comprising a frame, wherein:
the grill housing is secured to the frame, and
the drip pan is moveable relative to the grill housing.

4. The outdoor cooking grill of claim 3, wherein the drip pan is removable from the frame.

5. The outdoor cooking grill of claim 2, further comprising a second heating element positioned below the grilling surface, wherein the second pair of rails are positioned below the second heating element.

6. The outdoor cooking grill of claim 5, wherein:
the lower wall of the grill housing has a second number of holes defined therein, and
the lower wall is positioned between the second heating element and the second fluid pan such that fluid passes through the second number of holes and into the second fluid pan.

7. The outdoor cooking grill of claim 6, further comprising a third fluid pan, wherein:
the third fluid pan contacts the bottom wall of the drip pan, and
the third fluid pan is removable from the drip pan.

8. The outdoor cooking grill of claim 7, wherein the second fluid pan is positioned parallel to the first fluid pan in the drip pan.

9. The outdoor cooking grill of claim 8, wherein the third fluid pan is positioned perpendicular to the first fluid pan and the second fluid pan in the drip pan.

10. The outdoor cooking grill of claim 5, wherein the second fluid pan is positioned parallel to the first fluid pan in the drip pan.

11. The outdoor cooking grill of claim 1, further comprising a grill housing, wherein:
the grill housing has a front panel with control knobs mounted thereto, and
the drip pan is positioned below a first panel of the grill housing.

12. The outdoor cooking grill of claim 11, further comprising a lid secured to the grill housing, wherein the lid rotates relative to the grill housing between:
an open position in which the grilling surface is uncovered, and
a closed position in which the lid encloses the grilling surface.

13. The outdoor cooking grill of claim 5, wherein:
the first fluid pan has a pair of grooves that receive the first pair of rails, and
the second fluid pan has a pair of grooves that receive the second pair of rails.

14. An outdoor cooking grill, comprising:
a grill housing having a lower wall,
a grilling surface secured to the grill housing,
a first heating element positioned below the grilling surface,
a second heating element positioned below the grilling surface,
a drip pan positioned below the first and second heating elements, the drip pan comprising (i) a bottom wall, (ii) a first pair of rails extending upwardly from the bottom wall, the first pair of rails being positioned below the first heating element, (iii) a second pair of rails extending upwardly from the bottom wall, the second pair of rails being positioned below the second heating element, and (iv) a central rail extending upwardly from a central section of the bottom wall between the first pair of rails and the second pair of rails,
a first removeable fluid pan supported by the first pair of rails of the drip pan, and
a second removeable fluid pan supported by the first pair of rails of the drip pan,
wherein the central rail is spaced apart from the first removeable fluid pan and the second removeable fluid pan and is configured to prevent the first removeable fluid pan and the second removeable fluid pan from being positioned on the central section of the bottom wall.

15. The outdoor cooking grill of claim 14, wherein the lower wall has:
a first number of holes defined therein, and
a second number of holes defined therein,
wherein the lower wall is positioned between (i) the first heating element and the first fluid pan such that fluid passes through the first number of holes and into the first fluid pan, and (ii) the second heating element and the second fluid pan such that fluid passes through the second number of holes and into the second fluid pan.

16. An outdoor cooking grill, comprising:
a grilling surface,
a first heating element positioned below the grilling surface,
a second heating element positioned below the grilling surface,
a drip pan positioned below the first and second heating elements, the drip pan comprising: (i) a tray configured to slide horizontally outward relative to a front of a grill housing, (ii) a first removable fluid pan positioned in the tray below the first heating element, (iii) a second removable fluid pan positioned in the tray parallel to the first removable fluid pan, and (iv) a third removable fluid pan positioned in the tray perpendicular to the first removable fluid pan and the second removable fluid pan.

17. The outdoor cooking grill of claim 16, further comprising:
a frame,
wherein the grill housing is secured to the frame.

* * * * *